(12) United States Patent
Zizka et al.

(10) Patent No.: US 11,023,527 B2
(45) Date of Patent: Jun. 1, 2021

(54) USING OBSERVABLE DATA OBJECT TO UNMARSHAL GRAPH DATA

(71) Applicant: Red Hat, Inc., Raleigh, NC (US)

(72) Inventors: Ondrej Zizka, Ceske Budejovice (CZ); Jesse Daniel Sightler, Moncks Corner, SC (US)

(73) Assignee: Red Hat, Inc., Raleigh, NC (US)

( * ) Notice: Subject to any disclaimer, the term of this patent is extended or adjusted under 35 U.S.C. 154(b) by 100 days.

(21) Appl. No.: 15/902,297

(22) Filed: Feb. 22, 2018

(65) Prior Publication Data
US 2019/0258746 A1   Aug. 22, 2019

(51) Int. Cl.
  *G06F 17/00* (2019.01)
  *G06F 16/901* (2019.01)
  *G06F 16/9038* (2019.01)

(52) U.S. Cl.
  CPC ...... *G06F 16/9024* (2019.01); *G06F 16/9038* (2019.01)

(58) Field of Classification Search
  CPC ............. G06F 16/9024; G06F 16/9027; G06F 16/9038
  See application file for complete search history.

(56) References Cited

U.S. PATENT DOCUMENTS

| | | | |
|---|---|---|---|
| 6,424,991 B1 * | 7/2002 | Gish | G06F 9/5011 709/203 |
| 7,962,565 B2 | 6/2011 | Coker | |
| 9,110,711 B2 | 8/2015 | Abdelaziz et al. | |
| 9,135,145 B2 | 9/2015 | Voccio et al. | |
| 9,183,613 B2 | 11/2015 | Gong et al. | |
| 9,501,334 B2 | 11/2016 | Fink et al. | |
| 9,576,071 B2 | 2/2017 | Metreveli et al. | |
| 9,864,528 B2 * | 1/2018 | Vega-Gonzalez | G06F 3/0619 |
| 10,423,390 B1 | 9/2019 | Mani et al. | |
| 10,437,885 B2 * | 10/2019 | Zizka | G06F 8/70 |

(Continued)

FOREIGN PATENT DOCUMENTS

WO    2016198346 A1    12/2016

OTHER PUBLICATIONS

Oracle, "Oracle Fusion Middleware Understanding Oracle TopLink", Oracle Help Center, Copyright 2015, 22 pages.

(Continued)

*Primary Examiner* — Greta L Robinson
(74) *Attorney, Agent, or Firm* — Lowenstein Sandler LLP (57) ABSTRACT

Implementations of the disclosure provide for receiving, by a processing device, a request for a first data object associated with graph data elements and a metadata of a graph model, inspecting an observable data object to identify whether a copy of the first data object exists on a storage device associated with the processing device, responsive to failing to identify the copy of the first data object on the storage device, transmitting a service request to a host computer for the graph data elements, the service request comprising an identifier of the first data object, responsive to receiving the graph data elements from the host computer, retrieving, from the storage device, the metadata identified by a first reference stored in the observable data object, generating the first data object using the graph data elements and the metadata, and presenting the first data object on a display device.

17 Claims, 5 Drawing Sheets

(56) References Cited

U.S. PATENT DOCUMENTS

| | | | |
|---|---|---|---|
| 2006/0200438 | A1 | 9/2006 | Schloming |
| 2011/0082879 | A1* | 4/2011 | Hazlewood ......... G06F 16/9027 |
| | | | 707/770 |
| 2012/0096070 | A1 | 4/2012 | Bryzak |
| 2013/0117326 | A1 | 5/2013 | De Smet et al. |
| 2013/0268583 | A1 | 10/2013 | Sheppard et al. |
| 2016/0156631 | A1* | 6/2016 | Viswanathan ...... H04L 67/1097 |
| | | | 726/3 |
| 2016/0275583 | A1 | 9/2016 | Cambianica |
| 2018/0197128 | A1* | 7/2018 | Carstens ............ G06Q 10/0635 |
| 2019/0065620 | A1* | 2/2019 | Murray ................. G06N 5/022 |

OTHER PUBLICATIONS

Michael Hunger et al., "Spring Data Neo4j—Reference Documentation", 2010-2017 Graph Aware Ltd—Neo Technology, Inc.—Pivotal Software, Inc., 114 pages.

Anat Bhardwaj et al., "DataHub: Collaborative Data Science & Dataset Version Management at Scale", MIT; U. Maryland (UMD); U. Illinois (UIUC), Sep. 2, 2014, 7 pages.

Nguyen et al, "Building Call Graphs for Embedded Client-Side Code in Dynamic Web Applications", ECpE Department Iowa State University, USA; School of Computer Science Carnegie Mellon University, USA, Nov. 16-22, 2014, 12 pages https://www.cs.cmu.edu/~ckaestne/pdf/fse14.pdf.

Graph Visualization for Neo4j, NEO4J, accessed Aug. 18, 2017, 8 pages https://neo4j.com/developer/guide-data-visualization/.

Shiraguppi et al, "Graph Based Model for Object Access Analysis at OSD Client", Indian Institute of Technology, Kanpur, accessed Aug. 18, 2017, 12 pages https://www.cse.iitk.ac.in/users/moona/papers/hipc07.pdf/.

USPTO, Office Action for U.S. Appl. No. 15/681,014, dated May 9, 2019.

USPTO, Final Office Action for U.S. Appl. No. 15/681,014, dated Oct. 28, 2019.

USPTO, Office Action for U.S. Appl. No. 15/681,014, dated Apr. 15, 2020.

USPTO, Advisory Action for U.S. Appl. No. 15/681,014, dated Jan. 14, 2020.

USPTO, Final Office Action for U.S. Appl. No. 15/681,014, dated Oct. 19, 2020.

* cited by examiner

FIG. 5

USING OBSERVABLE DATA OBJECT TO UNMARSHAL GRAPH DATA

TECHNICAL FIELD

The implementations of the disclosure relate generally to computing infrastructures and, more specifically, relate to transparent asynchronous on-demand unmarshalling of graph data.

BACKGROUND

Computing systems and devices may access, store, process, or communicate with a database. A database may store data or information in various formats, models, structures, or systems using different types of database structures. Users or processes may access or query the databases to fetch or retrieve data in a database, or to transfer or otherwise share information between varying database systems as well as the computing systems and devices the databases support.

BRIEF DESCRIPTION OF THE DRAWINGS

The disclosure can be understood more fully from the detailed description given below and from the accompanying drawings of various implementations of the disclosure. The drawings, however, should not be taken to limit the disclosure to the specific implementations, but are for explanation and understanding only.

The disclosure is illustrated by way of examples, and not by way of limitation, and may be more fully understood with references to the following detailed description when considered in connection with the figures, in which.

DETAILED DESCRIPTION

A graph database uses graphs to represent information by one or more "graph" structures comprising nodes and edges contenting related nodes. A "graph" is a type of data structure (such as a directed acyclic graph) comprising nodes (also referred to as vertices), edges and attributes (also referred to as properties) to organize and store data. A "node" (also referred to as a node data structure) may represent, for example, stored data for an entity such as a person, business, account, artifact, etc. An "edge" may represent a relationship between a pair of entities. "Attributes" are stored information that relates to the nodes or edges. The nodes in the graphs may be connected together by one or more edges. For example, if two nodes have a common value for a particular attribute, an edge may be formed between the nodes representing the commonality. The nodes are configured to perform certain services associated with the graph, and such services can include sorting, querying and retrieving certain attributes for a particular entity of the graph.

The graph databases can store attributes as data values associated with the nodes and edges in a key-value pair. A "key" is generally a unique identifier that identifies a node or edge in a graph or a set of nodes or edges in a graph. In that regard, the graph database information may be sent and received from the graph database as key-value information. When graph database information is stored, a back-end server machine sends both a key and an attribute value to the graph database. When graph database information is retrieved, the server machine sends only a key to the graph database to retrieve the corresponding value for the node or edge stored in the graphs.

An object-oriented application can utilize the graph databases. Object-oriented applications organize data and routines together into encapsulated units referred to as objects. An "object" is a set of data and functional services or capabilities (e.g., routines) encapsulated into a single logical entity stored in memory. One type of object-oriented application, referred to herein as an object-graph mapper (OGM), maps nodes and the relationships between the nodes in the graph database to objects in an "authoritative model" of a system. The authoritative model describes what properties such as available object functionally or services an object of a given type may include, but does not include actual data for the object (e.g., identifiers, values, etc.). In one example, the authoritative model may represent native Java™ objects.

The OGM provides a way for the authoritative model of the objects to be persisted in the underlying graph database servers. For example, a user may use a graphical tool associated with the OGM to design a framework for classes that represent the authoritative model of an object. The OGM maps nodes and the relationships between the nodes in the graph to the authoritative models. The authoritative models are then stored on the and g graph database servers and can be used to query the graph data of the graph database. In some situations, an application interface may be used to transfer the "raw" graph data elements in the key-value pairs associated with the nodes and edges of the graph to a client device. During this transfer, however, the graph structure associated with the authoritative models is not maintained. As such, on the client side, it is necessary to recreate these graph structures using the "raw" graph data elements.

Implementations of the disclosure may provide a graphs manager for "unmarshalling" objects from the graph database. The object after unmarshalling is returned the clients as if the clients had them available in local memory or storage. In that regard, unmarshalling refers to the process of transforming a representation of an object that was used for storage or transmission to a representation of the object that is consumable by a processing device on a certain platform. In some implementations, the graphs manager may be installed at back-end server machine for performing the techniques disclosed herein. The graphs manager may inspect an authoritative model in order to generate client side object models that mimic the services provided by the authoritative model for an existing object.

In some implementations, the graphs manager uses "reflection" to inspect the authoritative model in order to generate a similar client side object model of a particular platform for a client device. For example, if an original authoritative model is for a first programming platform, such as native Java®, then a client side object model may be generated that is suitable for a second programming platform, such as TypeScript® or Python®. Reflection is a programming technique with the ability to identify what information the model contains and dynamically modify this information that may include the methods, attributes, etc. of classes associated with the models. Then, on a target programming platform, such as a programming platform of the client device, a processing device may use these generated client side object models to reconstruct the graphs back from the data retrieved from the graph database.

The generated client side object models may include metadata. The processing device may execute a client-application at the client device using the metadata to reconstruct the objects from raw graph data elements, such as the key-value pair data. This metadata may include information that describes the object associated with the inspected authoritative model, for example, this may include an object-type discriminator (e.g., object class type) for the object as well as other information associated with the object. For example, the object-type discriminator describes what model is to be used to reconstruct the object. In some implementations, the graph manager includes a service provider interface (SPI) that serves the raw graph data elements associated with the client side object models to the client device. For example, the client device via the client-application may provide graph queries to the SPI to get the raw graph data elements that represent an object stored in the graph database. Then, the client-application determines the object types based on their object-type discriminators in the metadata, and instantiates the objects at the client device which are then filled in with the raw graph data elements.

In some implementations, the client device via the client application may execute methods of a particular object of the client side object models. Upon calling a particular service of a certain object via the SPI, this call is intercepted by an object handler component of the graphs manager. The object handler component uses the certain data from that particular service to determine which nodes and data for those nodes to retrieve from the graph database. For example, this data may include an identifier for each of the nodes such as an uniform resource identifier (URI) that is a unique identifier for data in the graph database that is linked to the node, a numeric identifier corresponding to an internal graph database identifier, an identifier of a starting node and a set of matching criteria that can be applied to determine which related nodes to retrieve data from the graph database as well as other types of identifiers. The object handler then retrieves the raw graph data elements (e.g., key-value pair data) stored in the graph database for the nodes.

The object handler via the SPI returns the retrieved raw graph data elements to the client-application at the client device. Then, the client-application may instantiate a related object using this data in local memory or storage of the client device. In this way, the client application can retrieve graphs from the back-end graph database in the form of client platform specific objects mimicking the server side objects, and in a way that is transparent to the client device. For example, the client application that may instantiate the related object is a background process. Thus, an advantage of generating and using client side object models is that there is no need to rewrite new models for every new platform used to serve as the client platform. Moreover, since the client side object models are generated from one source they are less likely to get out of synchronization with the original authoritative models.

In some situations, a data object corresponding to a node representing an entity (e.g., "Customer") may already reside on the client. An application may need to access data objects of a related entity (e.g., "Account" of the Customer). In some implementations, responsive to receiving a request for the data objects of an entity (e.g., an Account), the client device may initiate a request for the data object to a server in communication with a graph database storing the graph data elements of the data object. The client device may run a reconstruction application to generate the data object using graph data elements and the metadata associated with a graph model. The server may include the graph manager to call a service specified for a graph model of the data object to retrieve these graph data elements from the graph database. Responsive receiving the graph data elements, the client device may use the graph data elements and metadata to reconstruct the data object. This approach does not take into consideration whether the requested data object already exists on the client side. Thus, this approach may be inefficient if the requested set of accounts is already on the client side (e.g., stored in a storage device accessible by the client device). To address the above-noted and other deficiencies, implementations of the president disclosure provide mechanism for the client device to determine whether a copy of the data object already exists on the client side. One implementation may provide an observable data object that may contain a metadata field for storing a reference to the metadata and a pre-fetched data field for storing a reference to a copy of the data object on the client side. An observable is a class of data objects that allow an observer to subscribe the data object and receive an item emitted from the data object in an asynchronous manner using a method associated with the data object. An observer is the receiving entity of the item emitted from the observer data object. In this example, a client application is the observer to receive an item from the observer data object. Depending on what is available, the client application may receive the copy of the data object if it exists on the client side or metadata associated with a graph model for generating the data object if the data object does not exist on the client side. A user of the client application may create, without invoking, the observable data object that defines methods to emit items (either the data object or the metadata). The client may subscribe to the observable data object. The subscription by the client application may initiate methods associated with the observable data object. The client can then perform other tasks without waiting for the items from the observable data object. Whenever the item is ready to be emitted by the observable data object, the observable data object may call the pre-specified method to inform the client. Thus, the client can receive the item from the observable data object in an asynchronous manner.

In one implementation, the user may have created the observable data object including a first reference to a metadata associate with a graph model and a second reference pointing to the location to store a pre-fetched data object. Responsive to receiving a request from a user for the data object, the client may subscribe to the observable data object to receive a data item emitted from the observable data object. The observable data object, executing on a processing device of the client device, may inspect whether the second reference to the data object exists in the observable data object to determine whether the data object is already on the client side. If the data object is on the client side, the observable data object may emit, to the client, the data object on the client side without further assistance from the server. If the execution of the observable data object, in view of the observable data object, determines that the data object is not on the client side, the client device may send an HTTP request to the server for the graph data elements of the data object, and reconstruct the data objects using the metadata already on the client side and the graph data elements of the data object retrieved from the server.

Figure 1:
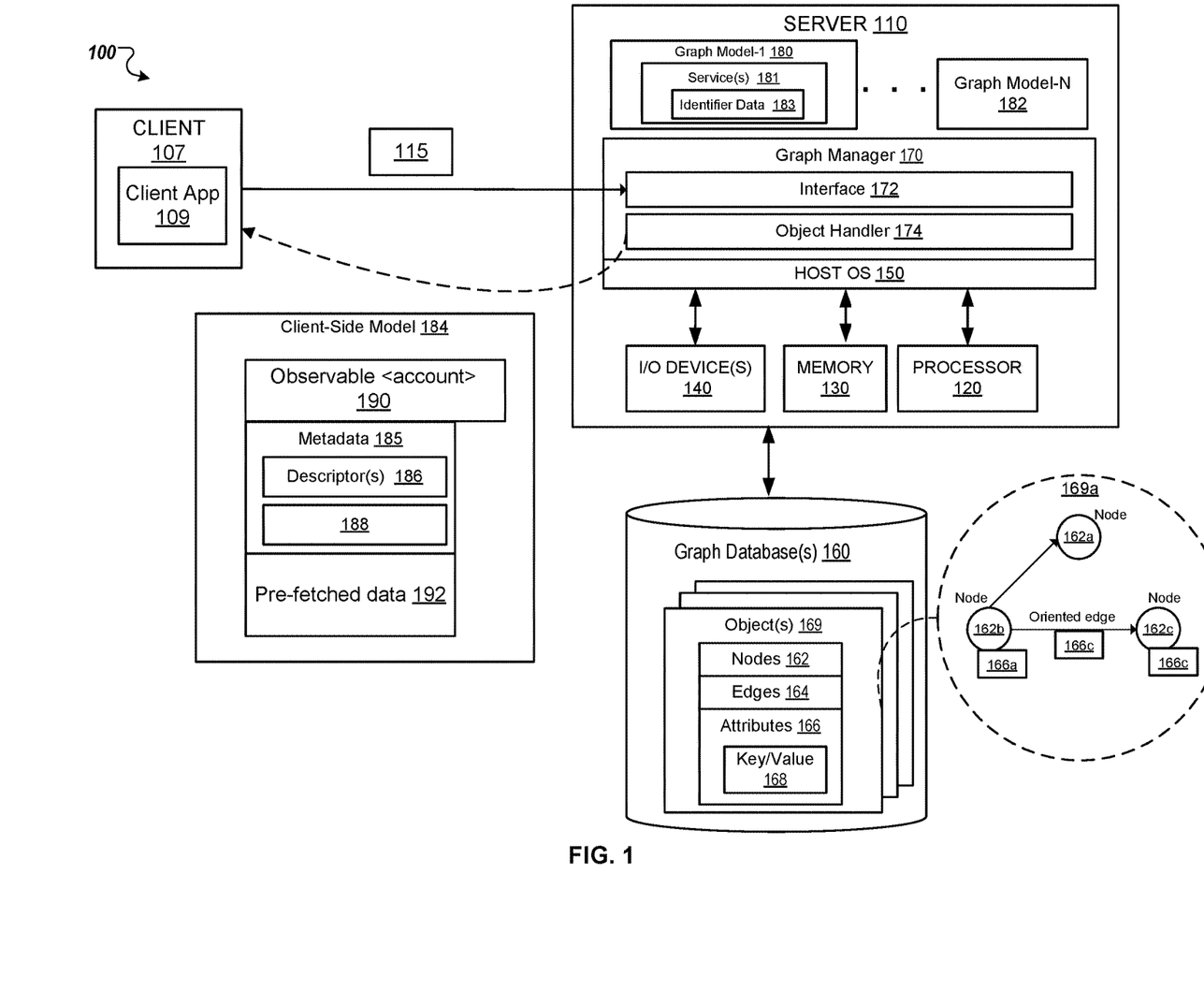
FIG. 1 is a block diagram of a computer system to support graph database backed object unmarshalling according to an implementation of the disclosure.

FIG. 1 is a computer system 100 according to implementations of the disclosure. "Computer system" 100 herein shall refer to a system comprising one or more computing devices, one or more memory devices, and one or more communication interfaces. As shown, the computer system 100 may include a client computer (e.g., client 107), and a server computing device (referred to later in this disclosure as server 110) coupled to a network (not shown) and including one or more processing devices (e.g., processor 120) communicatively coupled to memory (e.g., memory 130) and one or more input/output (I/O) devices (e.g., I/O devices 140). The network may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

"Processor" 120 may include logic circuits for executing instructions encoding arithmetic, logical, or I/O operations. In one illustrative example, a processor may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, processor 120 may be implemented as a single integrated circuit, two or more integrated circuits, or may be a component of a multi-chip module (e.g., in which individual microprocessor dies are included in a single integrated circuit package and hence share a single socket).

A processor 120 may also be referred to as a central processing unit (CPU). "Memory" 130 herein refers to a volatile or non-volatile memory device, such as RAM, ROM, EEPROM, or any other device capable of storing data. "I/O device" 140 herein refers to a device capable of providing an interface between a processor and an external device capable of inputting and/or outputting binary data. Although, for simplicity, a single processor 120 is depicted in FIG. 1, in some other embodiments the computing devices of computer system 100 may comprise a plurality of processors. Similarly, in some other embodiments the computing devices of computer system 100 may comprise a plurality of I/O devices, rather than a single I/O device 140.

The server 110 may be a server, a mainframe, a workstation, a personal computer (PC), a mobile phone, a palm-sized computing device, etc. The server 110 may run "host" software, such host operating system 150 to manage the hardware and other types of system resources that may include processors 120, memory 130, I/O device 140 to provide functions such as inter-process communication, scheduling, memory and data management, and so forth. For example, the host operating system 150 of server 110 may include a virtualization manager (not shown), such as a hypervisor. Alternatively, the hypervisor may a "bare metal" hypervisor that runs on hardware of computer system 110 without an intervening operating system. The hypervisor 150 may abstract the physical layer of server 110, including processor 120, memory 130, and I/O device 140, and present this abstraction to a client application, such as a virtual machine.

System 100, in implementations, may include one or more graph databases 160. In some implementations, the graph databases 160 may be a separate component from server 110. In alternative implementations, the graph databases 160 may part of the server 110. For example, all or part of the graph databases 160 may be in the memory 130 of server 110. In other implementations, the graph databases 160 can be divided into multiple databases with components that can be geographically dispersed and accessible, for example, via a network.

Graph database 160 may use graph data structures including nodes 162 (also referred to as a node data structure), edges 164 and attributes 166 to store data. For example, nodes 162a-c for object 169a may represent an entity such as people, businesses, accounts, artifacts, etc. Edge 164 may represent relationships between pairs of entities, such as the oriented edge between nodes 162b and 162c. In that regards, the nodes 162a-c in a particulate graph may be connected together by one or more edges 164. For example, if two nodes 162a-c have a common value for a particular attribute, an edge 164 may be formed between these two nodes to represent the commonality. The nodes 162a-c may be associated with certain services associated with the graph, and such services can include sorting, querying and retrieving certain attributes for a particular entity of the node.

Attributes 166a-c may represent information, such as a key/value map of properties 168, which relates to the nodes 162a-c or edges 164. The graph database 160 can store attributes 166 as data values associated with the nodes 162a-c and edges 164 in a key-value pair 168. A "key" is generally a unique identifier that identifies a node 162a-c or edge 164 in a graph or a set of nodes 162a-c or edges 164 in a graph. In that regard, the information may be sent and received from the graph database 160 as key-value information. When information is stored to the the graph database 160, server 110 sends both a key and a value to the graph database 160. When the information is retrieved from the graph database 160, the server 110 sends only a key to the graph database 160 to retrieve the corresponding attribute value for the node 162 or edge 164 stored in the graphs.

Nodes 162 and the edges 164 representing the relationships between the nodes 162 in the graph database 160 can be mapped to objects 169. For example, a user (such as an administrator) of system 100 may use an object-graph mapper (OGM) application to map nodes 162 of the graph database 160 into graph models 180-182 corresponding to object 169. In one implementation, the objects 169 may be represented as native Java™ objects. The graph models 180-182 describe what properties such as available object functionally or services 181 for the corresponding object 169 of a given type may include, but does not include actual data for that object. In some implementations, the services 181 may include identifier data 183 to determine which nodes 162 to retrieve data from the graph database 160. Identifier data 183 may include a unique identifier for each of the nodes. For example, the identifier data 183 may be a uniform resource identifier (URI) pointing to the location of the node. Identifier data 183 may be a numeric value corresponding to an internal graph database identifier. In one implementation, an identifier data 183 may include an identifier of a starting node and a set of matching criteria that can be applied to determine which related nodes to retrieve data from the graph database as well as other types of identifiers. The OGM abstracts the structure of the nodes 162 and their edges 164 and ensures the objects 169 to be persisted in the graph database 160. For example, the user may use a graphical tool associated with the OGM to design a framework for classes that represent the objects 169. The OGM may generate objects 169 (e.g., Java™ objects) representing the classes.

System 100, in implementations, may provide for unmarshalling these objects 169 returned from the graph database 160 to a client 107 in a way as if the client 107 had them available in local memory or local storage. In that regard, unmarshalling refers to the process of transforming a representation of an object that was used for storage or transmission to a representation of the object that is executable by a processing device on client 107. In some implementations, server 10 includes a graph manager 170. In some implementations, the functionality of the graph manager 170 can exist in a fewer or greater number of components than what is shown, with such components residing at one or more computing devices of system 100 that may be geographically dispersed. The components may be operable in conjunction with client 107 and server 110 from which it may receive requests to query the objects 169 and provide relevant information regarding those objects 169 from the graph databases 160.

The graph manager 170 on server 110 may generate client-side models 184 for clients (e.g., client 107) that mimic services 181 provided by the graph models 180-182 for objects 169 of the graph database 160, and manage the distribution of metadata 185 for these client-side models 184 to the client 107. This metadata 185 is a data object that may contain code and data that may cause the objects 160 to be reconstructed locally at the client 107. For example, this metadata 185 may instruct a client-application (not shown) at the client device 107 on how to reconstruct the objects 169 using raw graph data elements, such as the key/value pairs 168, from the graph database 160.

To generate the client-side models 184, the graph manager 170 may use the reflection to inspect the graph models 180-182 associated with the objects 169. Reflection is a programming tool used to inspect and dynamically call and identify classes, methods, attributes, etc. of objects, without knowing the names of the classes and methods of the objects beforehand. By using reflection, the graph manager 170 is able to determine which services 181 are associated with the objects 169. For example, the services 181 represents the classes and the functionally (e.g., methods) available to the objects 169 associated with the classes.

Once the graph model 180 for the graph object 169 is inspected, the graph manager 170 generates metadata 185 for the client-side model 184 that includes information to describe the object associated with the inspected model. For example, the metadata 185 may include an object-type descriptor (e.g., object class type) 186 for the object as well as fields 188 to store other relevant data associated with the object. This metadata 185 may instruct a client-application 109 at the client device 107 on how to unmarshal the objects 169 using raw graph data elements, such as the key/value pairs 168, from the graph database 160.

To facilitate operations of system 100 to support unmarshalling of objects 169 at the client device 107, the graph manager 170 includes an interface 172 also referred to herein in as service provider interface (SPI 172) that serves raw graph data elements, such as the key/values pairs 168) associated with nodes 162 of the graph models 180, to the client device 107, and an object handler 174 that uses the metadata 185 of the graph models 180 to determine which nodes 162 and related the key/value pairs data 168 for the raw graph data elements to retrieve or otherwise retrieve from the graph database 160.

In one implementation, client-side model 184 may include an observable data object 190 that contains a reference to metadata 185 and a second reference to a pre-fetched data object 192. Pre-fetched data object 192 is an object that had been generated and stored in a storage device on the client device. For certain entities, client device 107 may have previously retrieved and/or construct their corresponding data objects using retrieved graph data elements and the metadata. Client device may make data objects corresponding to these entities available on client device 107 as pre-fetched data object 192. For example, client device 107 may receive a request for information about all accounts of a customer. To retrieve data objects representing accounts of the customer, graph manager 170 may also retrieve data objects (such as transactions for each account) related to the accounts.

Figure 2:
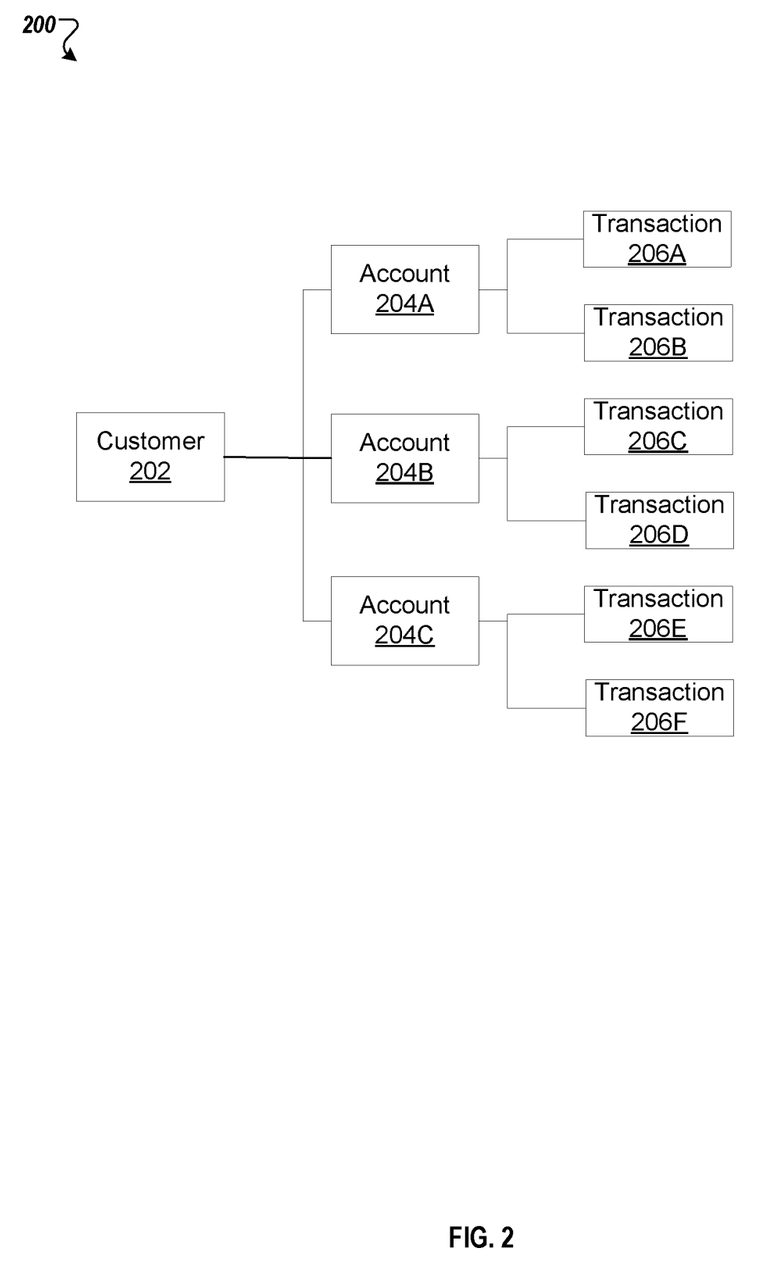
FIG. 2 illustrates related entities according to an implementation of the presentation.

FIG. 2 illustrates related entities 200 according to an implementation of the presentation. As shown in FIG. 2, a customer entity 202 may be related to multiple accounts 204A-B (e.g., accounts owned by a customer). Each account 204A-B may be related to one or more transaction entities 206A-F representing the transactions associated with the corresponding account.

Thus, responsive to receiving the request (e.g., using a key value representing the customer) by client application 109 for account information of customer 202, graph manager 170 may retrieve all account information including the related transaction entities 206A-F and provide the retrieved account entities 204A-C and transaction entities 206A-F to client application 109 running on client device 107. Client application 109 may store the retrieved account entities 204A-C and transaction entities 206A-F as pre-fetched data object 192 (as shown in FIG. 1) in a storage device (not shown). Further, client application 109 may store, in a field of observable data object 190, a reference to pre-fetched data object 192 stored in the storage device, where the reference may be a link (e.g., a hyperlink) to the pre-fetched data object 192. The reference indicates that the existence of the pre-fetched data object 192 is available on the client side. Later, when a customer further requests the transactions associated with a particular account, client-application 109 may determine that the requested transaction entities are in pre-fetched data object 192 that can be retrieved locally using the reference stored in observable data object 190, and retrieve the local copy rather than retrieve from graph database 160, thus improving the efficiencies of unmarshalling of graph data.

Responsive to determining that the requested data objects are not part of pre-fetched data object 192, client-application 109 may provide graph queries 115 to the SPI 172 to get the data comprising the raw graph data elements to instantiate objects 169 based on the client-side model 184. When this data is provided, the client-application 109 determines the object type of the nodes 162 of a particular object based on its object-type discriminator 186 in the metadata 185 to instantiate the objects 169 at the client device 107 and fills in the object with the data. In some implementations, the client device 107 via the client-application 109 may execute a method of a particular object as in typical object oriented programming.

Upon calling a particular method of a certain object via the SPI 172, this call is intercepted by an object handler component 174 of the graph manager 170. The object handler component 174 uses identifier data 183 of the services to determine which nodes and data for those nodes to retrieve from the graph database 160. For example, the object handler component 174 may use the identifier data 183 to identify nodes for the related object 169. The object handler component 174 then retrieves the raw graph data elements (e.g., key-value pair data 168) stored in the graph database 160 for the nodes. In this regard, references to specific graph data elements in the graph database 160, such as for the key-value pair data 168.

In some implementation, the identifier data 183 is used to identify the node of set of nodes in the object 169. In that regard, the graph manager 170 may determine identifiers for the nodes 162 in several ways. For example, the graph manager 170 may use the identifier data 183 to identify numeric identifiers representing internal graph database identifiers for one or more nodes 162 in a given object 169. In some implementations, the graph manager 170 may use the identifier data 183 to identify an identifier of a starting node 162 in the object 169 and criteria information to determine which nodes other nodes 162 are related to that node 162. For example, the graph manager 170 may traverse the object 169 and use the criteria information to identify the related nodes that match criteria information. In other implementations, other techniques may be used to determine identifiers for nodes 162 in the objects 169 to be unmarshaled at the client device 107.

The object handler component 174 returns the client-side model 184 along with a portion of all of the metadata 185 to the client-application 109 at the client device 107, which it uses as instructions to compose the object 169 at the client 107. For example, this causes the client-application 109 to instantiate related objects using this metadata 185 in local memory or storage of the client device 107, and fill in the instantiated objects with data values (e.g., key/value pairs) from the graph database 160. In this way, the client-application 109 can retrieve objects from the back-end graph database 160 in the form of client platform specific objects mimicking the server side objects, and in a way that is transparent to the client device 107. In one implementation, the client device 107 may display the client platform specific objects on a display device (e.g., a screen) for the user to view.

Figure 3:
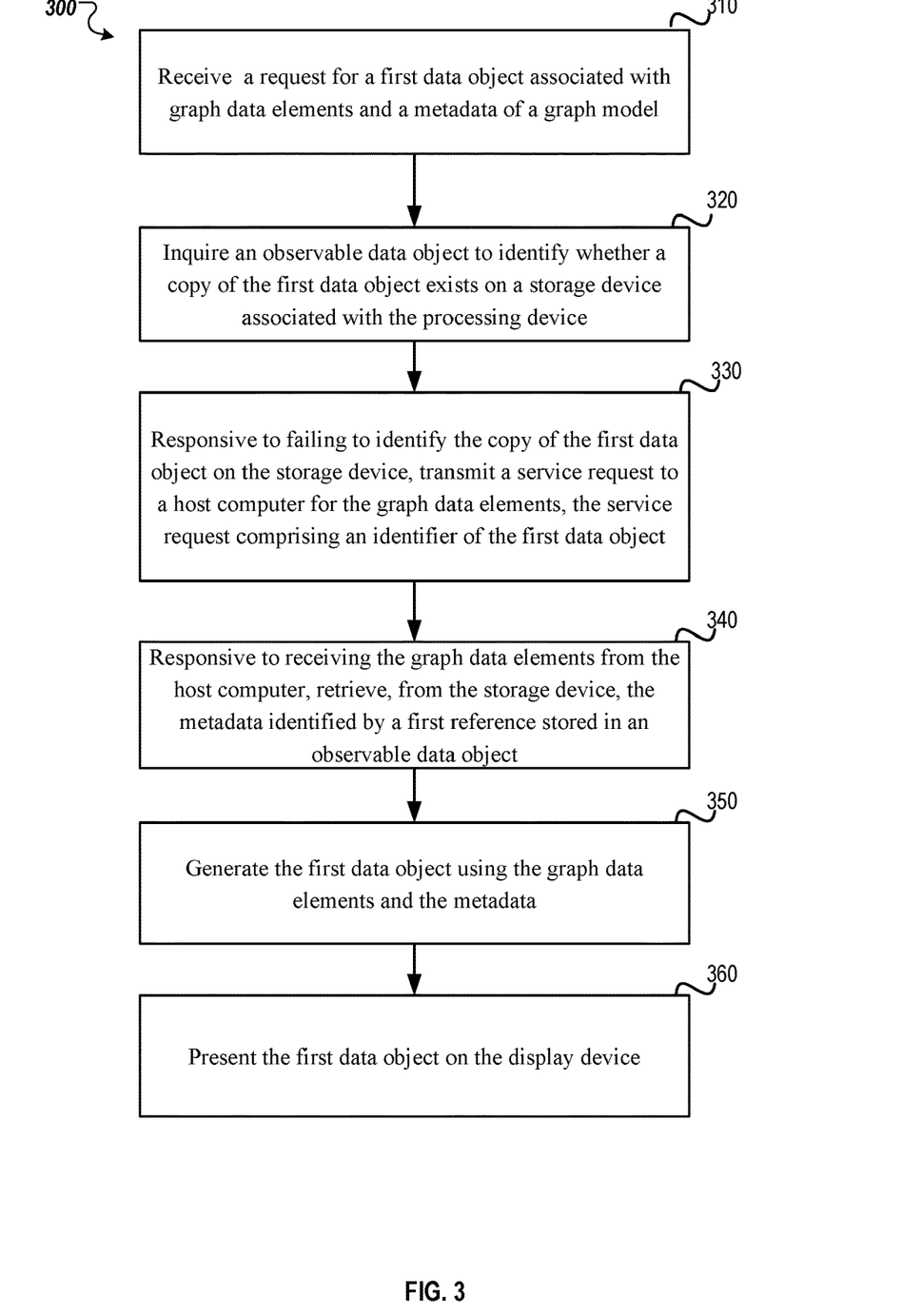
FIG. 3 depicts a flow diagram of one implementation of a method in accordance with one or more aspects of the disclosure.

FIG. 3 depicts a flow diagram of one implementation of a method 300 in accordance with one or more aspects of the disclosure. In one implementation, client device 017 may include a processing device to perform method 300 for supporting graph database backed object unmarshalling. The method 300 may be performed by processing logic that may comprise hardware (circuitry, dedicated logic, etc.), software (such as is run on a general purpose computer system or a dedicated machine), or a combination of both. Alternatively, in some other implementations, one or more processors of the computer device executing the method may perform routines, subroutines, or operations may perform method 300 and each of its individual functions. In certain implementations, a single processing thread may perform method 300. Alternatively, two or more processing threads with each thread executing one or more individual functions, routines, subroutines, or operations may perform method 300. It should be noted that blocks of method 300 depicted in FIG. 3 can be performed simultaneously or in a different order than that depicted.

Referring to FIG. 3, at block 310, the processing device may receive a request for a first data object associated with graph data elements and a metadata of a graph model.

At 320, the processing device may inspect an observable data object to identify whether a copy of the first data object exists on a storage device associated with the processing device.

At 330, responsive to failing to identify the copy of the first data object on the storage device, the processing device may transmit a service request to a host computer for the graph data elements, the service request comprising an identifier of the first data object.

At 340, responsive to receiving the graph data elements from the host computer, the processing device may retrieve, from the storage device, the metadata identified by a first reference stored in the observable data object.

At 350, the processing device may generate the first data object using the graph data elements and the metadata.

At 360, the processing device may present the first data object on a display device.

Figure 4:
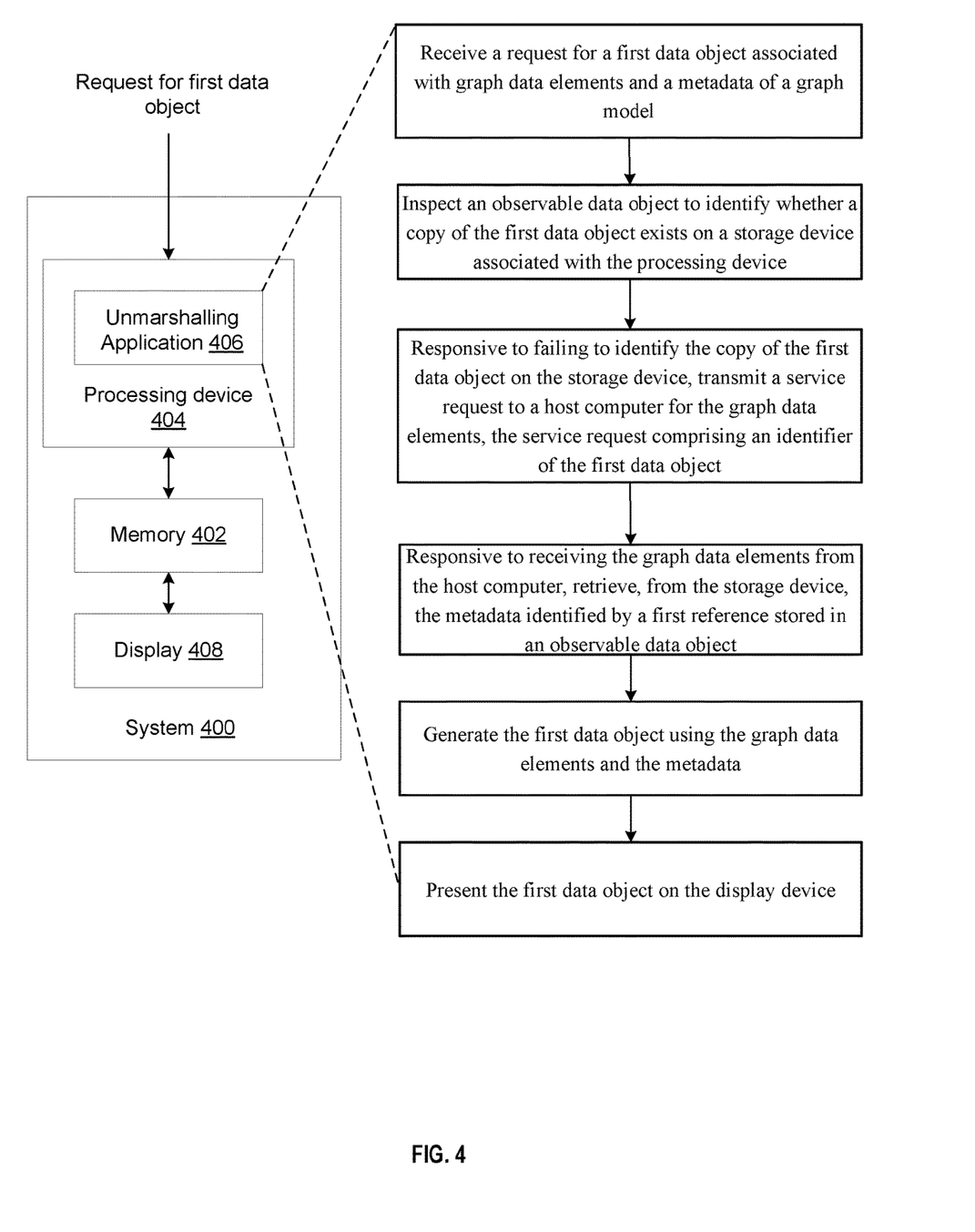
FIG. 4 is a system for unmarshalling of graph data according to an implementation of the present disclosure.

FIG. 4 is a system 400 for unmarshalling of graph data according to an implementation of the present disclosure. System 400 may include a memory 402, a display device 408, and a processing device 404 communicatively coupled to memory 402 and display device 408. The processing device 404 may execute unmarshalling application 406 to receive a request for a first data object associated with graph data elements and a metadata of a graph model, inspect an observable data object to identify whether a copy of the first data object exists on a storage device associated with the processing device, responsive to failing to identify the copy of the first data object on the storage device, transmit a service request to a host computer for the graph data elements, the service request comprising an identifier of the first data object, responsive to receiving the graph data elements from the host computer, retrieve, from the storage device, the metadata identified by a first reference stored in an observable data object, generate the first data object using the graph data elements and the metadata, and present the first data object on the display device.

Figure 5:
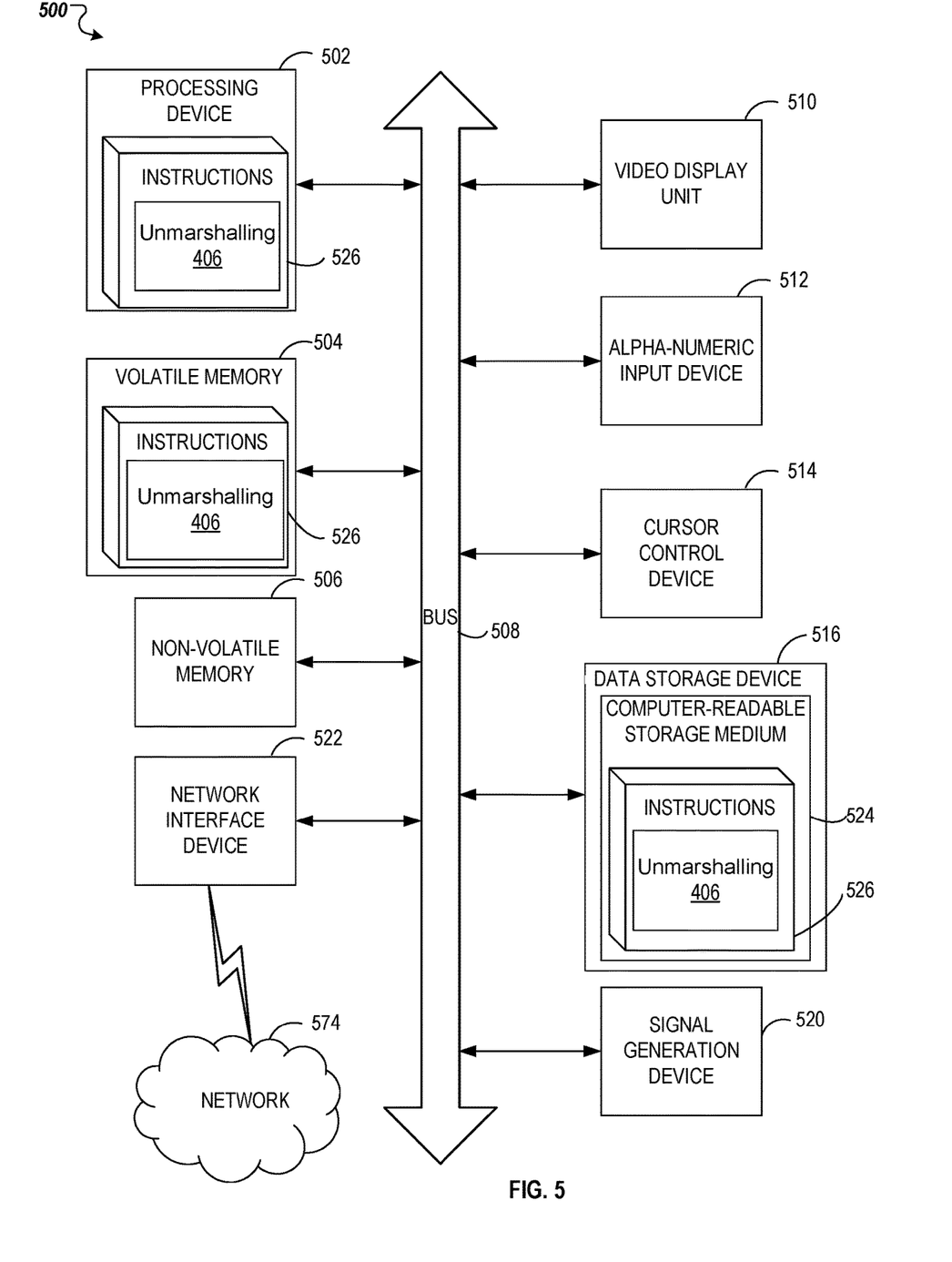
FIG. 5 illustrates a block diagram illustrating a machine in which implementations of the disclosure may be used.

FIG. 5 depicts a block diagram of a computer system operating in accordance with one or more aspects of the present disclosure. In various illustrative examples, computer system 400 may correspond to a computing device within system architecture 100 of FIG. 1.

In certain implementations, computer system 500 may be connected (e.g., via a network, such as a Local Area Network (LAN), an intranet, an extranet, or the Internet) to other computer systems. Computer system 500 may operate in the capacity of a server or a client computer in a client-server environment, or as a peer computer in a peer-to-peer or distributed network environment. Computer system 500 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein for live storage domain decommissioning.

In a further aspect, the computer system 500 may include a processing device 502, a volatile memory 504 (e.g., random access memory (RAM)), a non-volatile memory 506 (e.g., read-only memory (ROM) or electrically-erasable programmable ROM (EEPROM)), and a data storage device 516, which may communicate with each other via a bus 508.

Processing device 502 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 500 may further include a network interface device 522. Computer system 500 also may include a video display unit 510 (e.g., an LCD), an alphanumeric input device 512 (e.g., a keyboard), a cursor control device 514 (e.g., a mouse), and a signal generation device 520.

Data storage device 516 may include a non-transitory computer-readable storage medium 524 on which may store instructions 526 encoding any one or more of the methods or functions described herein, including instructions encoding the graph manager 170 of FIG. 1 for implementing method 300 of FIG. 3 or method 400 of FIG. 4 for supporting graph database backed object unmarshalling.

Instructions 526 may also reside, completely or partially, within volatile memory 504 and/or within processing device 502 during execution thereof by computer system 500, hence, volatile memory 504 and processing device 502 may also constitute machine-readable storage media.

While non-transitory computer-readable storage medium 524 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "identifying," "determining," "intercepting," "updating," "retrieving," "generating," "inspecting," "causing" or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

The disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems appears as set forth in the description below. In addition, the disclosure is not described with reference to any particular programming language. It is appreciated that a variety of programming languages may be used to implement the teachings of the disclosure as described herein.

The disclosure may be provided as a computer program product, or software, that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein, but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A method comprising:
receiving, by a processing device, a request for a first data object associated with graph data elements and a metadata of a graph model;
inquiring an observable data object to identify whether a copy of the first data object exists on a storage device associated with the processing device;
responsive to failing to identify the copy of the first data object on the storage device, transmitting a service request to a host computer for the graph data elements, the service request comprising an identifier of the first data object;
responsive to receiving the graph data elements from the host computer, retrieving, from the storage device, the metadata identified by a first reference stored in the observable data object;
generating the first data object using the graph data elements and the metadata; and
presenting the first data object on a display device.

2. The method of claim 1, wherein to identify whether the copy of the first data object exists on the storage device, the processing device is further to determine whether a second reference to the first data object is present in the observable data object.

3. The method of claim 2, further comprising:
   determining that the second reference to the copy of the first data object is present in the observable data object; and
   retrieving the copy of the first data object from the storage device.

4. The method of claim 1, further comprising:
   generating the metadata associated with the graph model; and
   storing the first reference to the metadata in a field of the observable data object.

5. The method of claim 1, comprising:
   generating a second data object related to the first data object;
   responsive to generating the second data object, generating the copy of the first data; and
   storing a second reference to the copy of the first data object stored in the observable data object.

6. The method of claim 1, wherein the graph model comprises a plurality of node data structures, and wherein the identifier identifies one of the plurality of node data structures.

7. A non-transitory machine-readable storage medium storing instructions that, when executed, cause a processing device to:
   receive, by the processing device, a request for a first data object associated with graph data elements and a metadata of a graph model;
   inquire an observable data object to identify whether a copy of the first data object exists on a storage device associated with the processing device;
   responsive to failing to identify the copy of the first data object on the storage device, transmit a service request to a host computer for the graph data elements, the service request comprising an identifier of the first data object;
   responsive to receiving the graph data elements from the host computer, retrieve, from the storage device, the metadata identified by a first reference stored in the observable data object;
   generate the first data object using the graph data elements and the metadata; and
   present the first data object on a display device.

8. The non-transitory machine-readable storage medium of claim 7, wherein to identify whether the copy of the first data object exists on the storage device, the processing device is further to determine whether a second reference to the first data object is present in the observable data object.

9. The non-transitory machine-readable storage medium of claim 8, wherein the processing device is further to:
   determine that the second reference to the copy of the first data object is present in the observable data object; and
   retrieve the copy of the first data object from the storage device.

10. The non-transitory machine-readable storage medium of claim 7, wherein the processing device is further to:
    generate the metadata associated with the graph model; and
    store the first reference to the metadata in a field of the observable data object.

11. The non-transitory machine-readable storage medium of claim 7, wherein processing device is further to:
    generate a second data object related to the first data object;
    responsive to generating the second data object, generate the copy of the first data; and
    store a second reference to the copy of the first data object stored in the observable data object.

12. A system, comprising:
    a display device;
    a storage device to store metadata associated with a graph model;
    a processing device, communicatively coupled to the display device and the storage device, the processing device to:
      receive a request for a first data object associated with graph data elements and the metadata of the graph model;
      inquire an observable data object to identify whether a copy of the first data object exists on the storage device associated with the processing device;
      responsive to failing to identify the copy of the first data object on the storage device, transmit a service request to a host computer for the graph data elements, the service request comprising an identifier of the first data object;
      responsive to receiving the graph data elements from the host computer, retrieve, from the storage device, the metadata identified by a first reference stored in the observable data object;
      generate the first data object using the graph data elements and the metadata; and
      present the first data object on the display device.

13. The system of claim 12, wherein to identify whether the copy of the first data object exists on the storage device, the processing device is further to determine whether a second reference to the first data object is present in the observable data object.

14. The system of claim 13, wherein the processing device is further to:
    determine that the second reference to the copy of the first data object is present in the observable data object; and
    retrieve the copy of the first data object from the storage device.

15. The system of claim 12, wherein the processing device is further to:
    generate the metadata associated with the graph model; and
    store the first reference to the metadata in a field of the observable data object.

16. The system of claim 12, wherein the processing device is further to:
    generate a second data object related to the first data object;
    responsive to generating the second data object, generate the copy of the first data; and
    store a second reference to the copy of the first data object stored in the observable data object.

17. The system of claim 12, wherein the graph model comprises a plurality of node data structures, and wherein the identifier identifies one of the plurality of node data structures.

* * * * *